Figure 1:
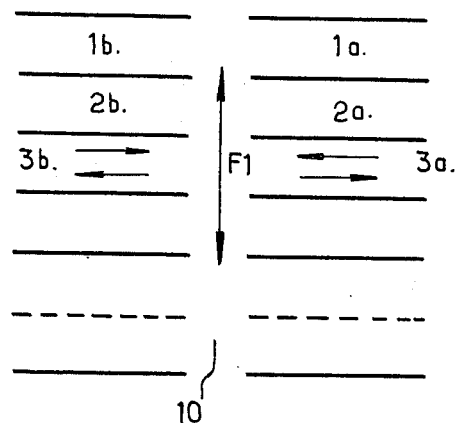

United States Patent [19]

Goussard

[11] 4,008,668
[45] Feb. 22, 1977

[54] ELECTRIC CIRCUIT FOR SELF-PROPELLING TROLLEYS IN STORAGE INSTALLATIONS

[75] Inventor: Alain Goussard, Louviers, France
[73] Assignee: Construction Mills-K, France
[22] Filed: Apr. 21, 1975
[21] Appl. No.: 570,329
[30] Foreign Application Priority Data
Feb. 20, 1975 France .............. 75.05265
[52] U.S. Cl. .................. 104/88; 191/2; 214/16.4 B
[51] Int. Cl.² ................ B60M 1/00
[58] Field of Search .......... 214/16.4 B; 246/182 B; 104/88, 148 R; 191/2, 12; 186/28

[56] References Cited
UNITED STATES PATENTS

| | | | |
|---|---|---|---|
| 3,503,530 | 3/1970 | Burch | 214/16.4 B |
| 3,797,678 | 3/1974 | Richardson | 214/16.4 B |
| 3,827,365 | 8/1974 | Coppel | 104/88 |
| 3,851,593 | 12/1974 | Gagnon | 104/88 |
| 3,937,431 | 2/1976 | Güntner | 246/182 B |

Primary Examiner—Trygve M. Blix
Assistant Examiner—Reinhard J. Eisenzopf
Attorney, Agent, or Firm—William Anthony Drucker

[57] ABSTRACT

The circuits comprise a first part located at a control station where the trolley lies when not operated, and a second part located on the trolley. The first part comprises a three phase power circuit and a control circuit for the trolley. The connection between two parts is effected by only three active conductors, although the power supply is of the three phase type, the control signals being transferred to the second part when only two of the three phase conductors are coupled to the second part. To this end, a time lag contact controlled by a relay of said control circuit is inserted in the coupling of one of the three conductors and the circuit of the second part includes a memory relay which is energized by means of the two other conductors and which is no longer energized when the third phase is applied to the second part.

5 Claims, 7 Drawing Figures

Fig.5 ized dimensions of a reel used for the connecting cable by reducing on the one hand the volume of the cable and on the other the volume of the winch motor whose total power is lower. The risk of incidents also decreases with the number of conductors used.

ELECTRIC CIRCUIT FOR SELF-PROPELLING TROLLEYS IN STORAGE INSTALLATIONS

The invention relates to automatically operating self-propelling trolleys used more particularly in dynamic storage installations connected to their fixed or movable control and supply station by means of a cable.

In view of the length of the storage bays and the volume of automatically transmitted data, it is necessary to reserve a large volume on the trolley for winding on the cable, e.g. 12-conductor cable.

The object of the present invention is a system of electro-mechanical circuits located in part on the trolley and in part on the control and supply station, as a result of which the number of cable conductors between the two parts is limited to three, plus optionally an earthed conductor which makes it possible, whilst providing identical mechanical protection, to considerably reduce the overall dimensions of a reel used for the connecting cable by reducing on the one hand the volume of the cable and on the other the volume of the winch motor whose total power is lower. The risk of incidents also decreases with the number of conductors used.

The invention is applied to trolleys where the various electric motors necessary for performing the operations such as lifting, translation, etc. are in the form of three-phase motors. It is pointed out that the rotation direction of these motors depends on the order of connecting the supply phases.

The trolley has a certain number of devices, pick-off elements and end of travel detectors which, depending on their position and/or state, actuate corresponding electro-mechanical contacts, opening or closing the associated circuits and bring about the starting up or stoppage of one or more motor members on the trolley.

In the known installations separate conductors are provided respectively for the transmission of data from each of these contacts.

In the system of circuits according to the invention which only has three active conductors there are provided memory relays in which are stored the various control instructions from the trolley, as well as time-lag contacts and relays, optionally included in the memory relays in such a way that one of the three supply phases of the trolley is connected to the power supply source with a predetermined delay during which the memory relays record the operating instructions, and during which the switchovers are performed which ensure during the supply of the third phase the rotations in the respective correct directions of the different motors.

According to a preferred embodiment of the invention, a time-lag memory relay is provided for permitting the emergency manual control of the trolley.

Figure 2:
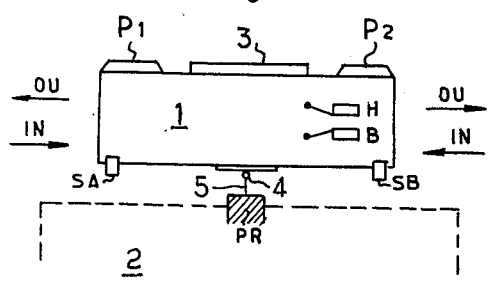
Figure 3:
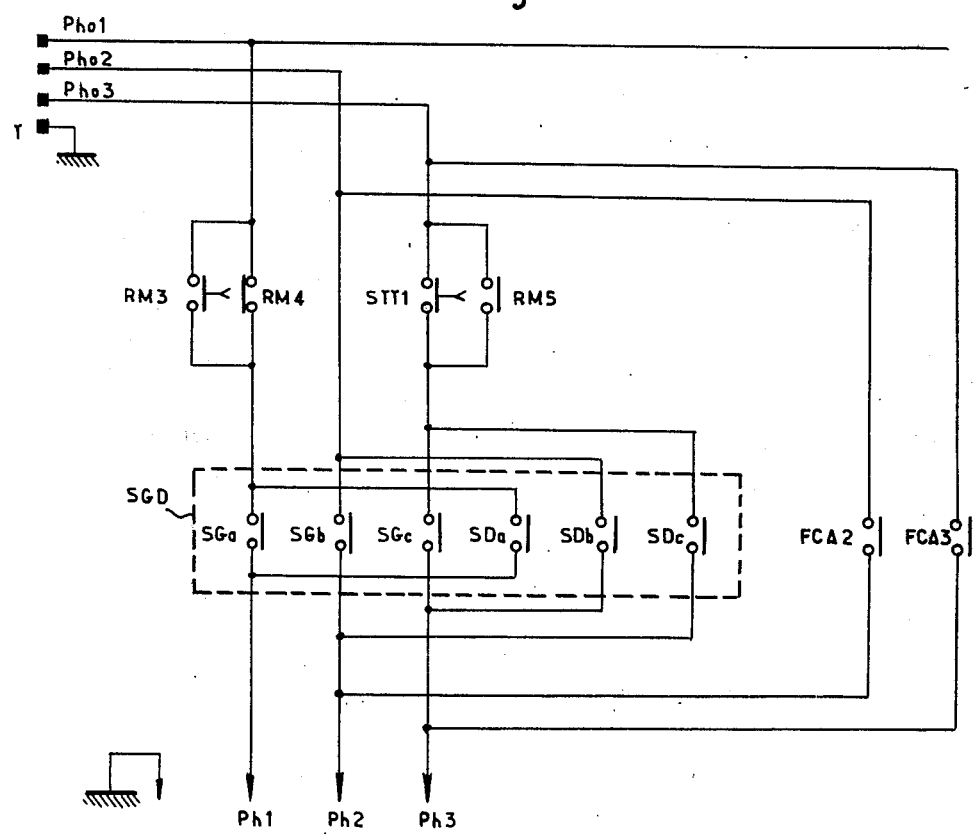
Figure 4:
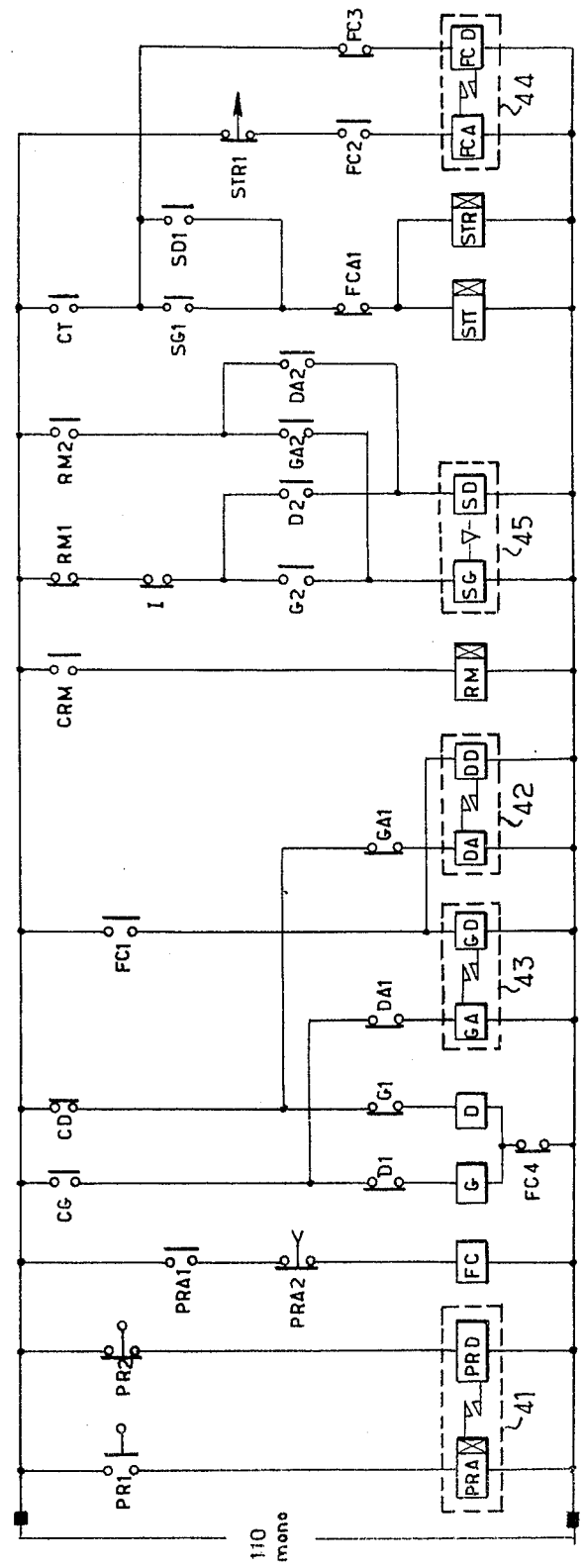
Figure 6:
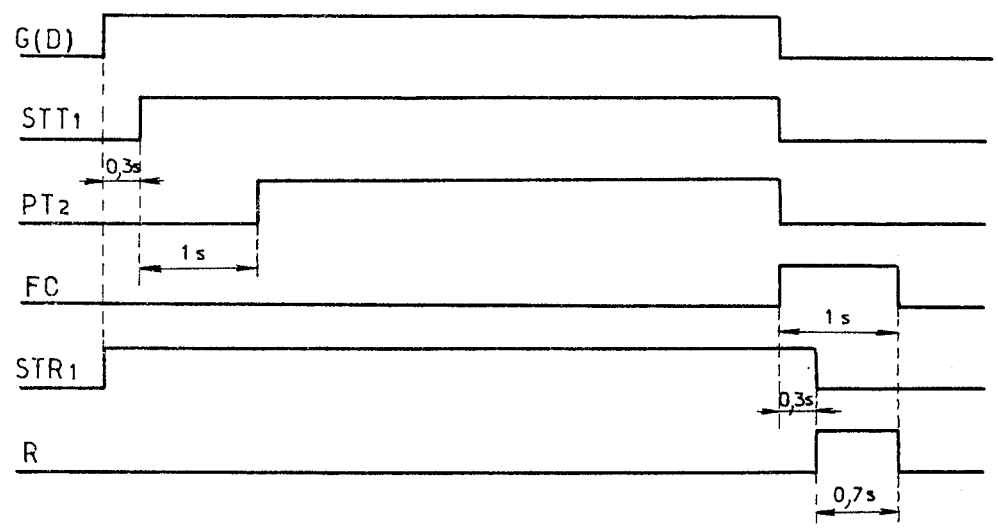
Figure 7:
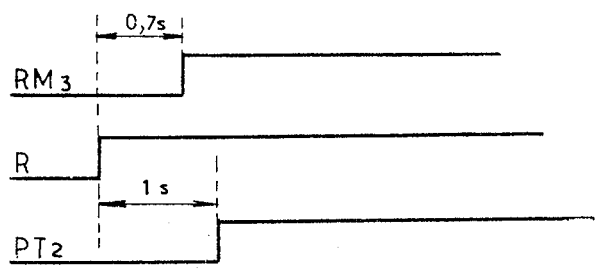

The invention will be better understood from reading the following description with reference to the drawings, wherein show:

FIG. 1, a schematic plan view of a storage installation using a self-propelling trolley associated with a control and supply circuit according to the invention;

FIG. 2, a schematic front view of a self-propelling trolley to which the present invention is applied;

Figure 5:
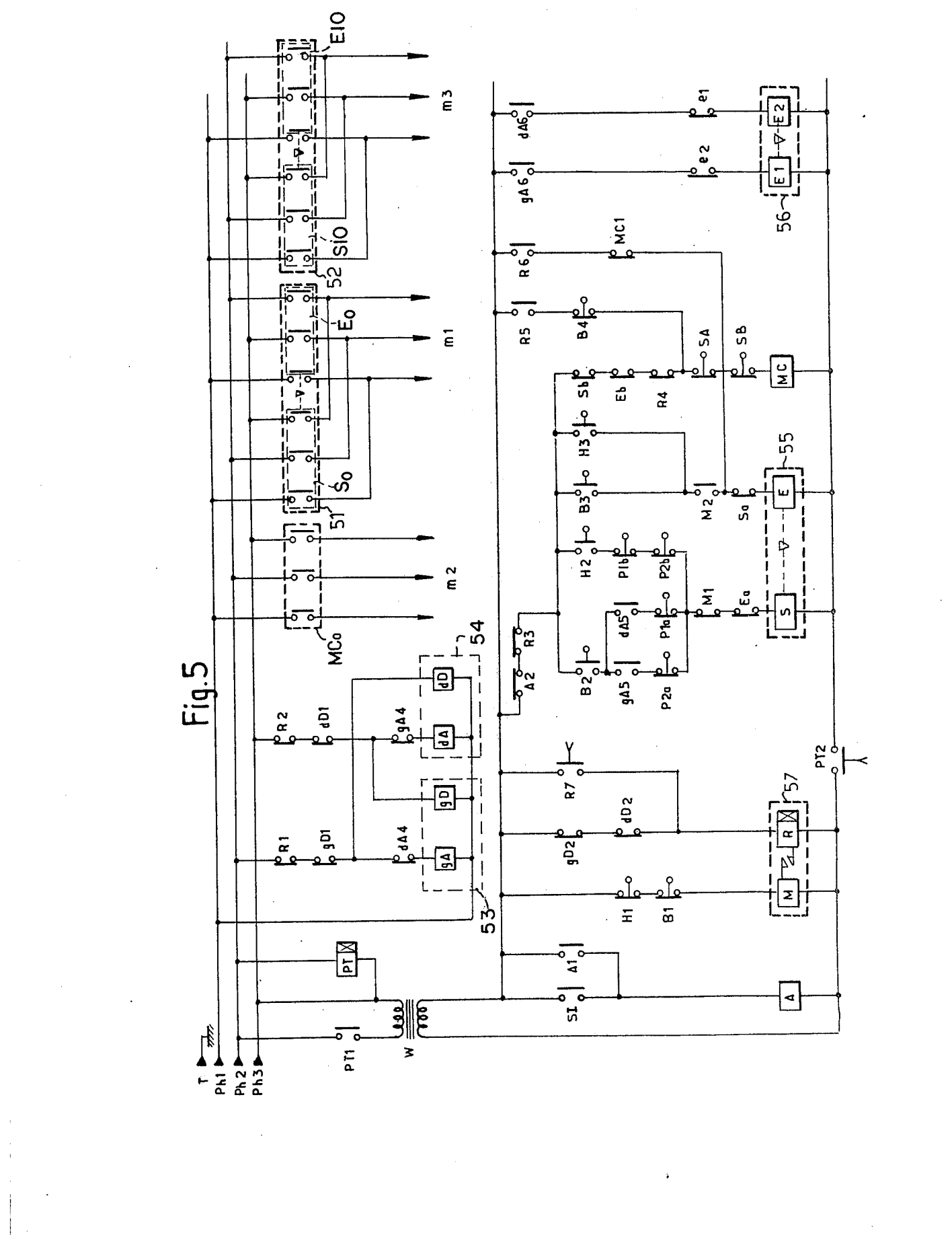

FIGS. 3, 4 and 5, together form the circuit of the invention, whereby FIGS. 3 and 4 are respectively the electrical diagrams of the supply and control circuits for the trolley located beyond the same, and FIG. 5 the electrical circuit diagram located on the trolley;

FIGS. 6 and 7, explanatory timing charts.

Although the invention can be used no matter what the origin of the trolley power supply, e.g. fixed station or intermediate transfer vehicle, and whatever the trolley displacement relative thereto, it will be specifically described for the case of a storage installation having, as shown in FIG. 1, two systems of parallel storage corridors, respectively 1a, 2a, 3a etc., 1b, 2b, 3b etc., located on either side of a central passageway 10. The self-propelling trolley 1 in FIG. 2 is transported in this central passageway by means of an auxiliary transfer vehicle 2 which automatically stops in front of the selected corridor, whereby the trolley 1 moves only in the storage corridors.

The trolley also has load-gripping and depositing means, for example a movable platform 3 having two extreme levels. Such a self-propelling trolley - transfer vehicle system can be in the form described, for example, in U.S. Pat. No. 3,417,879 filed on Oct. 18, 1966, for "Transporting systems", U.S. Pat. No. 3,557,973 filed on Nov. 15, 1968, for "Automatic transfer device designed for a dynamic storage installation", the trolley being the Transrobot and the intermediate vehicle the Transferobot, and U.S. Pat. No. 3,827,365 filed on Apr. 26, 1972 for "Automatic Type of Load-Carrying-Trolley and its applications to Storage Installations on One or More Levels" which shows a preferred winch embodiment for the cable between the fixed and mobile circuits. These three patents are made by reference part of this application.

FIG. 2 shows in an upright view perpendicular to the axis of central passageway 10 the self-supporting trolley 1 in place on transfer vehicle 2, whereof only the upper part is shown in dotted lines. Vehicle 2 moves in the directions indicated by the arrow $F_1$ in central passageway 10. Trolley 1 moves when vehicle 2 is stopped in front of a pair of lateral corridors na, nb ($n = 1, 2, 3$ etc.) to the right or left of vehicle 2. The above-mentioned specifications describe devices for the control of vehicle 2 and for the precise mechanical alignment with the various corridors na, nb.

The installation can also have one or more gangways which are perpendicular to the storage corridors each containing an auxiliary vehicle such as vehicle 2.

Trolley 1 has a lifting platform 3 having two positions, a low position which enables it to pass beneath loads and a high position for the transfer of a load. The end of travel detectors H and B are associated with this platform.

The trolley also has:

Two detectors for detecting the presence of a load or pick-off elements P1 and P2 respectively to the right and left;

two detectors SA and SB respectively to the right and left prohibiting setting down and preventing any movement of lifting platform 3 during the time when trolley 1 has not completely left vehicle 2. These detectors can be of any known type, e.g. mechanical, magnetic, electromagnetic etc. According to a preferred embodiment they comprise inductances whose reluctance varies depending on whether or not they face a metal number, i.e. in the present case whether they are positioned facing the upper platform of the transfer vehicle on which is located the trolley;

a cam 4 cooperating with the finger 5 of an end of travel detector PR placed on transfer vehicle 2 and controlling the correct stoppage of trolley 1 in the centre of vehicle 2.

The trolley has a winch (not shown) for winding up a cable fixed to vehicle 2 and means ensuring the tension of the cable no matter whether the trolley moves away from or towards the vehicle.

This cable transmits:

i. The electric power necessary for the motor ensuring the movement of the trolley relative to the vehicle, for the motor ensuring the raising or lowering of the platform and for the winch motor;

ii. the stop-go instructions for the motors and the instructions for the selection of their rotation direction, which are worked out on the basis of preliminary instructions and data supplied by the various detectors and pick-off elements.

The trolley has its own automatic equipment and is autonomous with the exception of its power supply if it receives from the fixed station one of the four following instructions:

a. movement to the left
b. movement to the right
c. end of movement
d. return of the trolley to normal operation at the end of a possible break in the power supply.

The circuits according to the invention make it possible for the trolley to store this data prior to the reception by the same of the third supply phase. They are located in part on transfer vehicle 2, to which is secured the end of the cable and in part on trolley 1.

Hereinafter the term "fixed circuits" is understood to mean those which are located on the transfer vehicle and which in the absence of a transfer vehicle are located at the fixed station, and the term "movable circuits" covers those located on the self-propelling trolley.

To provide a better understanding of the operation of these circuits, the same reference numerals have been used but with different indices for designating all the elements of the same relay or the same switch, as well as the contacts actuated on the basis of the same control device even though they form part of separate elements.

As in order to understand the operation of the circuits according to the invention, it is necessary to refer simultaneously to the three circuits of FIGS. 3, 4 and 5, a preliminary description of these circuits is given hereinafter.

The fixed circuits comprise:

The three-phase supply circuit for the trolley shown in FIG. 3; the trolley control circuit shown in FIG. 4.

The trolley motors operate at 380 volts three-phase. The three phases conductors are given the references Ph1, Ph2 and Ph3 on the supply cable, whereby T designates the earthed conductor.

The three supply phases on the power supply side are designated by the references Pho1, Pho2, and Pho3. Hereinafter their correspondence with phases Ph1, Ph2 and Ph3 will be shown.

In detail the fixed circuits comprise:

1. A mechanically locked left-right reverser 45 comprising two relays SG and SD (FIG. 4) respectively controlling contacts SG1 and SD1 (FIG. 4) mounted in parallel on the discharge control circuit for the trolley, whereby the term "discharge" is understood to mean the disconnection of the trolley from its carrying vehicle indicated by the arrows OU in FIG. 2, as well as switch SGD consisting of two groups of three pairwise facing contacts SGa, SGb, SGc and SDa, SDb, and SDc (FIG. 3) which, depending on their positions connect phases Pho1, Pho2 and Pho3 with Ph1, Ph2 and Ph3 or with phases Ph1, Ph3, Ph2 respectively.

2. Two relays respectively for the displacement of the trolley to the left and right of the central passageway designated by G and D (FIG. 4), each associated with two contacts G1, G2 and D1, D2, whereby G1 and D1 in series with D and G respectively are normally closed live and G2 and D2 in series respectively with SG and SD are normally open live.

5. Two memory relays 42 and 43 (FIG. 4) respectively storing the operating instructions to the left or right of the central passageway.

Each relay has a coupling coil (DA, GA) and a decoupling coil (DD, GD). The coupling coils each control two contacts DA1 and DA2 and GA1 and GA2 respectively (FIG. 4), whereby contacts DA1 and GA1 are normally closed and contacts GA2, DA2 associated with reversing circuits 45 are normally open.

4. A memory relay 41 having a time lag coupling coil PRA and a decoupling coil PRD. Coil PRD is normally live when finger 5 is not pulled and contact PR2 is normally closed. Coil PRA is energized by closing sensor contact PR1 which is normally open and which closes when the trolley is in place in the centre of the transfer vehicle (or more generally its platform), when finger 5 is operated by cam 4 (FIG. 2). Coil PRA controls two contacts in series on the end of cycle control circuit. These contacts are contact PRA1 which is normally open live and contact PRA2 which is normally closed and timed to the excitation of relay PRA.

5. An end of cycle relay FC controlling four contacts among which contact FC1 is normally open and in series with both coils GD and DD, whilst contact FC2 is normally open and contacts FC3 and FC4 are normally closed:

6. A memory relay 44 having a coupling coil FCA in series with contact FC2 and a decoupling coil FCD in series with contact FC3. Relay 44 stores the end of cycle data and its coupling coil FCA controls three contacts, contact FCA1 (FIG. 4) is normally closed and in series with one or other of the contacts SG1 and SD1 on the trolley discharge control circuit and contacts FCA2 and FCA3 (FIG. 3) which at the end of the cycle directly connect phases Pho2 and Pho3 to phases Ph2 and Ph3 respectively.

7. A time lag relay (0.30 sec.) STT on trolley discharge circuit in series with contacts FCA1 and SG1, SD1. This relay controls contact STT1 (FIG. 3) which is normally open live timed at 30 sec. relative to the excitation of the relay and which is in series with Pho3 and one or other of the contacts SGc, SDc.

8. A time lag relay STR of 0.3 sec. in the end of trolley discharge circuit and in parallel with relay STT. This relay controls a contact STR1 which is normally closed timed to the denergization of relay STR and mounted in series with contact FC2 on the circuit of coil FCA.

9. A time lag relay RM for the storage of a manual return instruction timed at 0.7 sec. controlling five contacts, RM1 and RM2 which are respectively normally closed and open associated with reverser 45, contact RM4 (FIG. 3), normally closed, mounted in parallel with contact RM3 which is normally open and timed to the excitation of the relay on phase Pho1 and contact RM5 which is normally open and connected in parallel on contact STT1 (FIG. 3).

The fixed circuits also have manual or remotely controlled switches for controlling the operating cycle and more specifically switch CG for starting a cycle to the left of the central passageway, switch CD for starting a cycle to the right of the central passageway, switch CRM for the manual control of the trolley return, switch I for controlling the trolley discharge circuit and a circuit breaker CT in series with the discharge circuit automatically closed when the voltage of 380 V is applied to the power supply circuit, whereby the control circuit (FIG. 4) operates at 110 V single phase.

The circuits on the trolley, the so-called movable circuits whose diagram is shown in FIG. 5 comprise:

1. A system of contacts controlling the supply of the trolley motors with 380 V three-phase.

2. A control circuit for these contacts having a part operating between two phases of the 380 V supply and a part operating at 110 V supplied via a transformer W.

The trolley has three three-phase motors:

a. Translation motor $m1$ which revolves successively in the two directions in each cycle. The power supply instruction for the phases is defined by switch SGD (FIG. 3) for each cycle, motor $m1$ being supplied by a multiple reversing switch 51 having two groups of three contacts, whereby group So brings about the direct connection of the phases Ph1–91, Ph2 –92 and Ph3–83 and Pho3–Ph3) and group Eo which reverses phases $q2$ and $q3$, $q1$, $q2$ and $q3$ being the phases of motor $m1$. Position So corresponds to the discharge of the trolley from its platform and position Eo to its return thereto.

b. A lifting motor $m2$ coupled by triple contact MCo. The lifting platform 3 is operated by a set of eccentric cams whereby the profile of each cam has an axis of symmetry passing through the centre of rotation of the cam. These cams can be driven in one or other direction as required.

c. Motor $m3$ which is coupled to the reel is a cumulative compound motor which in the absence of the resisting torque will always be supplied with the command of the phases corresponding to the same rotation direction, namely that corresponding to the winding on the cable.

In view of the two possibilities for supply instructions for phases Ph2 and Ph3 (FIG. 3), the motor is supplied by means of a multiple reversing switch 52 controlled indirectly by the reverser 45. Multiple reversing switch 52 has two groups of contacts, whereby group S10 connects directly phases Ph1, Ph2, Ph3 to phases $r1$, $r2$, $r3$ of the motor $m3$, while group E10 exchanges the coupling of phases $r2$ and $r3$.

3. A left cycle memory relay 53 having a coupling coil gA and a decoupling coil gD respectively controlling the normally closed contact gA4 and the normally open contacts gA5 and gA6 on the one hand, and on the other the normally closed contacts gD1 and gD2.

4. Symmetrically a memory relay 54 having two coils dA and dD controlling contacts dA4, dA5, dA6, dD1 and dD2.

5. A time lag relay PT (1 sec.) controlling contact PT1 which is normally open and time lag contact PT2 (1 sec.) timed to the excitation of the relay.

6. Sensor contacts H1 (normally closed), H2 and H3 (normally open), actuated by the end of travel detector H (FIG. 2).

7. Sensor contacts B1 and B4 (normally closed) and B2 and B3 (normally open actuated by the end of travel detector B.)

8. A mechanically locked translation direction reversing relay 55 having two coils S and E respectively controlling each of the two normally closed single contacts (Ea, Eb and Sa, Sb) and one of the groups (So, Eo) of contacts of reversing switch 51.

9. A relay MC controlling the three contacts MCo of the lifting motor and a normally closed contact MC.

10. A mechanically locked reverser 56 having two coils E1, E2, controlling circuit breakers $e1$, $e2$, normally closed live and reversing switch 52.

11. A time lag memory relay 57 having a coupling coil M in series with contacts H1 and B1 and a time lag decoupling coil R.

Coil M controls contact M1 which is normally closed in series with relay S and contact M2 normally open in series with coil E.

Coil R controls 7 contacts:
contacts R1 and R2 normally closed in series with coils gA and dA respectively;
a normally closed contact R3 common to the circuits of relays S, E and MC;
another closed contact R4 in series in the feed circuit of relay MC and two normally open contacts R5, R6 on the lifting and translation control circuits;
a contact R7 timed to the excitation of relay 57 which is normally open live.

12. Normally closed sensor contacts P1a, P1b actuated by pick-off element P1 and contacts P2a, P2b actuated by pick-off element P2 (FIG. 2).

13. Two normally closed sensor contacts SA and SB actuated by the pick-off elements with the same reference designation.

The circuit also has a disconnecting relay A which is generally excited and maintained when an overload is tripped, excitation taking place by closing, by means of conventional not shown overload relays, a circuit breaker SI which is normally open, and maintained by closing contact A1 controlled by the relay. Contact A2 is then opened thus the supply for motors $m2$ and $m1$.

Hereinafter is described the automatic operation of the circuit resulting from the relationship between the various relays and contacts in the case of an unloading cycle, a loading cycle and in the case of a manually controlled return.

A. Unloading cycle

It is assumed here that the trolley must pick up a parcel located in a corridor located to the left of the central passageway.

Initially with the trolley located on vehicle 2 the end of travel contacts PR1, PR2 are actuated and relay 41 is coupled. Detectors SA and SB are active interrupting the circuit or relay MC (FIG. 5). The end of travel contact B is actuated. The end of travel contacts P1 and P2 are free. The left cycle control circuit breaker CG is operated either manually or by remote control depending on the type of installation involved.

The closing of circuit breaker CG brings about the arming of memory relay 43 and the excitation of relay G, whereby the latter moves the left-right reverser 45 into the left position (coil SG supplied via contact G2).

Switch SGD is positioned at position SGa, b,c. Time lag relay STT is excited via contact SG1 closed by SG and brings about the closing of contact STT1 with a time lag of 0.3 sec. as indicated in the timing chart of FIG. 6 where the switching times of the circuits carrying the references indicated to the left of the various lines are shown. Phase Ph3 is coupled to phase Pho3, 0.3 sec. after coupling phases Ph1 and Ph2 to Pho1 and Pho2.

During this 0.3 sec. relay gA of store 53 (FIG. 5) whose excitation circuit is on phases 1 and 2 is coupled, opening contact gA4 in the feed of coil dA of relay 54, closing contact gA5 in parallel in the feed circuit of coil S of relay 55, controlling the translation motor $m1$ and closing contact gA6 in the feed of coil E1 of relay 56 for motor $m3$. On receiving phase 3 time lag relay PT (FIG. 5) is excited, permitting at the end of 1 second by closing contact PT2 to excite relay S of reverser 55 and relay E1 of reverser 56, which places reversing switch 51 in position So and reversing switch 52 in position S10. Motors $m1$ and $m3$ are supplied with phases Ph1, Ph2 and Ph3 coupled respectively to Pho1, Pho2 and Pho3.

Motor $m1$ drives the trolley to the left. Contact PR is then released bringing about the disarming of store 41. The leftward displacement of the trolley continues until pick-off element P2 detects a load or palette which causes through the opening of contact P2a the interruption of the excitation of coil S. No further power supply reaches $m1$ and the trolley stops underneath the palette.

As relays S and E are not excited, relay MC is closed causing the lifting motor to be energized with phases Ph1, Ph2 and Ph3 coupled respectively to Pho1, Pho2 and Pho3.

The end of travel contact B is released, whilst end of travel contact H is not yet activated and store 57 is armed.

As soon as the platform reaches the raised position, contact H1 opens, reverser 55 flips to position E, opening contact Eb which interrupts the power supply to motor $m2$, relay MC being no longer live.

As supply phases 2 and 3 of motor $m1$ are reversed, the latter rotates in the opposite direction bringing the trolley back to the transfer vehicle.

The end of travel contact PR is actuated when the trolley has returned to its initial position. Relay PRA brings about the closing of contact PRA2 for 1 sec. and relay FC (FIG. 3) which is then excited permits through an external not shown system the stoppage of the left control cycle.

In the same way stores 43 and 42 are disarmed and reverser 45 returns to the inoperative position.

At the end of timing relay STR phases 2 and 3 are coupled to the trolley via relay FCA for 0.7 sec. (1 sec. of FC less 0.3 sec. of STR).

This time period makes it possible to disengage store 57 because the circuit of coil M is opened by contact H1 and the circuit of coil R closed by contacts gD2 and dD2 which are not excited in the absence of the third phase. There is no danger of the motor contacts being excited during this time interval of 0.7 sec., since contact PT2 has a time lag of 1 sec.

B. Loading cycle

It is assumed that the loaded trolley must deposit a palette in a corridor located to the right of the central passageway.

Initially with the trolley located on the transfer vehicle the contacts PR1 and PR2 are respectively closed and opened.

Detectors SA and SB are active, whilst end of travel contacts P1 and P2 are free. The end of travel contacts H are actuated, the trolley being in the upper loaded position.

Circuit breaker CD is actuated which results in the excitation of relays D,Da of store 42, and SD of reverser 45. By closing contact SD1 relay SD excites the time lag relay STT. It is now phase Ph2 which is connected with a time lag of 0.3 sec. to phases Ph1 and Ph3.

During this 0.3 sec. store 53 engaged in the previous movement is disarmed by relay gD and store 54 is armed.

At the end of 1 sec. by closing contact PT2, coil S of the translation reverser 55 is excited as is coil E2 of the reel reverser 56, contact dA6 being closed by arming delay dA.

The translation motor then revolves in the direction which causes the trolley to move towards the right. The reel motor rotates in the same direction because the direction of the phases has been reversed twice with reference to the previous case, once by switch SGD and once by switch 52 under the control of relay E2.

When the pick-off element P2 detects a palette it opens the circuit of relay S which stops motor $m1$. Relay MC is then excited (contact Sb closed) and the lifting motor is supplied in the opposite direction.

The end of upward travel contacts are no longer actuated which brings about the arming relay M. When the lifting platform reaches its lower position, contacts B are actuated. Coil E is then excited via B3 and the trolley moves off in the opposite direction until the end of travel contact PR is actuated, exciting relay FC. Control contact CD is then broken.

Relay M is disarmed as in the previous case.

The externally controlled circuit breaker I prevents the excitation of reverser 45 in the case of a manipulation prohibiting the movement of the trolley from its platform (e.g. transfer vehicle being manipulated).

The time lag control relay STT is only excited when contact CT designating the presence of the 380 V voltage is closed. If there has been a break no matter whether relay STT is armed or not at this time, the opening of contact CT returns it to the disarmed state unless it is already in this state and when current flows again the phase connection cycle automatically takes place in the normal manner, i.e. with a retarded connection of one of the phases relative to the connection of the two other phases.

C. Case of manual return

This is the case where the special control means CRM is operated which has the effect of returning the trolley to its inoperative position no matter what its position was at the time of this manipulation — this control is only used in the case of a defect of any type.

When an incident occurs the general relay A (FIG. 5) automatically stops the trolley.

The three-phase power supply as well as the left control (CG) and right control (CD) of the trolley are interrupted after establishing the incident either by manual interruption if this is noted visually or by automatic interruption in the case of a too long cycle time. After re-connecting the power supply the manual return control means CRM is operated which excites relay RM, the previous command CG or CD having been stored by one of the relays 42 and 43, whereby contact RM1 opens and contact RM2 in closing flips reverser 45 to SG or SD via GA2 or DA2 controlled by memory relay 43.

Phases 2 and 3 are simultaneously despatched to the trolley, whilst phase 1 is despatched 0.7 sec. later when time lag RM has expired (cf. FIG. 7).

Phases 2 and 3 permit the immediate excitation of relay R (FIG. 5) because relays gD and dD are not live. Relay R is self-maintained at the end of 0.3 sec. Relays gA and dA of stores 53 and 54 remain in the position which they occupied before the incident.

When phase 1 has been transmitted and after the closing of contact PT2 the movements performed are:

The lowering of the platform unless it was already in the low position and none of the contacts SA, SB (FIG. 2) is actuated;

return of the Transrobot when lifting is at an end (coil E excited);

and the rotation of the reel motor in the same direction as prior to the incident.

The remainder of the cycle is the same as for a normal movement.

The invention is not limited to the embodiments described and represented which have been provided solely as examples. It can in particular be applied to all types of self-propelling trolleys having an automatic cycle no matter what type of lifting means are used.

I claim:

1. A system of remote control and power supply circuits for a self-propelling electric trolley supplied by means of a cable and having its own automatic operating means, which has to perform a certain number of operations whilst moving relative to a fixed or movable reference station, and said trolley being equipped with pick-off elements and end of travel detectors, as well as translation and load-manipulating motors of the three-phase type and sensitive to the order of connecting the phases, whereby the said system has:

on the reference station : a fixed power supply circuit supplied with three-phased current and a fixed control circuit for said fixed power supply, said fixed control circuit being supplied with single-phase current, and, on the trolley a mobile supply and control circuit for three-phased electric motors, wherein said fixed power supply circuit comprises a time lag contact (STT1, FIG. 3) in series with one of the phases in order that, when the three phase power is applied, one of the phases is energized with a delay with respect to the energizing of the two other phases, wherein said fixed control circuit comprises a relay (STT, FIG. 4) which is energized when the three phase power is applied and which controls said time lag contact, and wherein said movable circuit comprises a control memory relay (53 or 54, FIG. 5) supplied by the two simultaneously energized phases and motor control relays (55, 56, MC) supplied by the time lagged phase and one of the two other phases.

2. System of circuits according to claim 1, wherein the said trolley can move to the right or to the left of the reference station and the fixed supply circuit has a triple reversing switch, whilst the fixed control circuit has a reversing relay controlling the said switch, wherein the said reversing relay is automatically positioned at one or other of its positions depending on whether the instruction received is that of forming an operating cycle to the right or left of the reference platform, and wherein the circuit on the trolley comprises a further control memory relay also energized by two simultaneously energized phases, the said relays being coupled on the one hand respectively to the two phases (Ph3, Ph2) which are alternatively time lag coupled according to the position of the said triple reversing switch, and, both to the third phase (Ph1) which is never time-lagged.

3. A system of circuits according to claim 2, wherein the fixed control circuit comprises an end of cycle circuit including a relay (41, FIG. 4) timed to the de-energization and a time lag contact (PRA2) controlled by the said latter relay which controls the excitation of a further relay (FC) which in turn controls a double circuit breaker (FCA1, FCA2) in the fixed supply circuit which breaker short-circuits the said reversing switch and the said time lag contact of the said fixed power supply circuit.

4. A system of circuits according to claim 3, wherein, in order to provide a manual trolley return control
the fixed control circuit further comprises a time lag relay (RM)
the fixed supply circuit comprises a contact (RM4) timed to the excitation of the said last mentioned relay and two untimed contacts also controlled said last mentioned relay, whereby one of the untimed contacts which is normally closed is coupled in parallel to the terminals of the last mentioned timed contact in the supply circuit of the phase which cannot be reversed, whilst the other untimed and normally open contact is arranged in parallel to the first mentioned timed contact
and the movable circuit comprises a further timed memory relay (R) which stores the direction of travel at the time when the return instruction is transmitted.

5. A system of circuits according to claim 4, associated with the trolley comprising a motor which must always be supplied with the same order of phases, wherein the movable circuits further comprises a relay-operated reversing switch (56) controlling a multiple inverter switch (52) positioned in the supply circuit of the said motor, the said relay-operated reversing switch being controlled by contacts (gA6, dA6) operated by said control memory relays (53, 54), whereby it flips at the start of the cycle.

* * * * *